US008070173B2

United States Patent
Watson

(10) Patent No.: US 8,070,173 B2
(45) Date of Patent: Dec. 6, 2011

(54) PUSH TO RELEASE RETRACTABLE SIDE STEP

(75) Inventor: Bradley E. Watson, Barrie (CA)

(73) Assignee: Magna International Inc, Aurora (CA)

( * ) Notice: Subject to any disclaimer, the term of this patent is extended or adjusted under 35 U.S.C. 154(b) by 312 days.

(21) Appl. No.: 12/438,796

(22) PCT Filed: Aug. 27, 2007

(86) PCT No.: PCT/CA2007/001481
§ 371 (c)(1),
(2), (4) Date: Feb. 25, 2009

(87) PCT Pub. No.: WO2008/022458
PCT Pub. Date: Feb. 28, 2008

(65) Prior Publication Data
US 2009/0250896 A1    Oct. 8, 2009

(51) Int. Cl.
*B60R 3/00* (2006.01)
*B60S 9/02* (2006.01)
(52) U.S. Cl. .................. 280/166; 280/163; 280/764.1
(58) Field of Classification Search ............. 280/166, 280/163, 169, 762, 763.1, 764.1, 765.1, 766.1; 292/113
See application file for complete search history.

(56) References Cited

U.S. PATENT DOCUMENTS

| 1,242,828 | A  | * | 10/1917 | Lyle .............................. 105/448 |
| 6,533,303 | B1 | * | 3/2003  | Watson .......................... 280/166 |
| 6,840,526 | B2 |   | 1/2005  | Anderson et al. |
| 7,367,574 | B2 | * | 5/2008  | Leitner .......................... 280/166 |
| 7,380,807 | B2 | * | 6/2008  | Leitner .......................... 280/166 |
| 7,398,985 | B2 | * | 7/2008  | Leitner et al. ................. 280/166 |
| 2003/0094781 | A1 | * | 5/2003 | Jaramillo et al. ............ 280/166 |
| 2003/0132595 | A1 | * | 7/2003 | Fabiano et al. ............... 280/166 |

FOREIGN PATENT DOCUMENTS
CA        2586030        5/2006

* cited by examiner

*Primary Examiner* — J. Allen Shriver, II
*Assistant Examiner* — James M Dolak
(74) *Attorney, Agent, or Firm* — Miller Canfield

(57) ABSTRACT

A step assembly includes a mounting bracket assembly adapted to be fixedly secured to a motor vehicle. A first arm includes one end pivotal with respect to the mounting bracket assembly and an opposing end. A second arm includes one end pivotal with respect to the mounting bracket assembly and an opposing end. A step pad assembly is pivotally coupled to the opposing end of each of the first and second arms. The step pad assembly includes a step movable between a retracted position and an extended position. A push to release mechanism is operably coupled to at least one of the first and second arms to release the step from one of the retracted and extended positions in response to a push action on the step.

18 Claims, 5 Drawing Sheets

PUSH TO RELEASE RETRACTABLE SIDE STEP

BACKGROUND

The invention relates to a step assembly for a motor vehicle. More particularly, the invention relates to a step assembly including a step movable via a push to release mechanism between a retracted position and an extended position.

It is well-known in the art to provide fixed running boards or fixed step assemblies for assisting individuals in either entering and exiting or accessing a motor vehicle having a high ground clearance. These fixed running boards are, however, often placed at a height that is not practical for a large number of users. In addition, these fixed running boards are susceptible to dirt and mud accumulation, which is easily transferred to a user's clothing. Moreover, these fixed running boards reduce the ground clearance for the motor vehicle.

Retractable running boards or step assemblies are movable between a retracted position, in which a step is tucked underneath an underbody of the motor vehicle, and an extended position, in which the step is spaced apart from the underbody of the motor vehicle for supporting the user. Retractable running boards commonly incorporate a four-bar link for moving the step between the retracted and extended positions.

SUMMARY

According to one aspect of the invention, a step assembly includes a mounting bracket adapted to be fixedly secured to a motor vehicle, and a step. The step assembly includes first and second arms each having one end pivotal with respect to the mounting bracket and an opposing end pivotally coupled to the step for pivotally moving the step between a retracted position and an extended position. A push to release mechanism is operably coupled to at least one of the first and second arms for allowing movement of the step between the retracted and extended positions in response to a push action on the step.

According to another aspect of the invention, a step assembly includes a mounting bracket adapted to be fixedly secured to a motor vehicle. A drive shaft is rotatable relative to the mounting bracket. An arm has one end fixedly secured to the drive shaft and an opposing end. A step is pivotally coupled to the opposing end of the arm and movable between a retracted position and an extended position. A latch assembly includes a latch hub operably coupled to the drive shaft and movable in response to movement thereof. The latch hub is movable between a locked position, in which the latch assembly maintains the step in the retracted position, and an unlocked position, in which the latch assembly allows for movement of the step between the retracted and extended positions.

According to yet another aspect of the invention, a latch assembly is provided for a step assembly having a mounting bracket, at least one arm secured to a rotatable drive shaft, and a step movable between a retracted position and an extended position. The latch assembly includes a pawl bracket adapted to be fixedly secured to the mounting bracket. A pawl is rotatably mounted to the pawl bracket. A latch hub is operably coupled to the drive shaft for movement between a locked position, in which the pawl engages the latch hub to prevent rotation of the drive shaft, and an unlocked position, in which the pawl releases the latch hub to allow rotation of the drive shaft for movement of the step between the retracted position and the extended position.

BRIEF DESCRIPTION OF THE DRAWINGS

The invention will be readily appreciated as the same becomes better understood by reference to the following detailed description when considered in connection with the accompanying drawings wherein.

DETAILED DESCRIPTION OF THE EMBODIMENT

Figure 1:
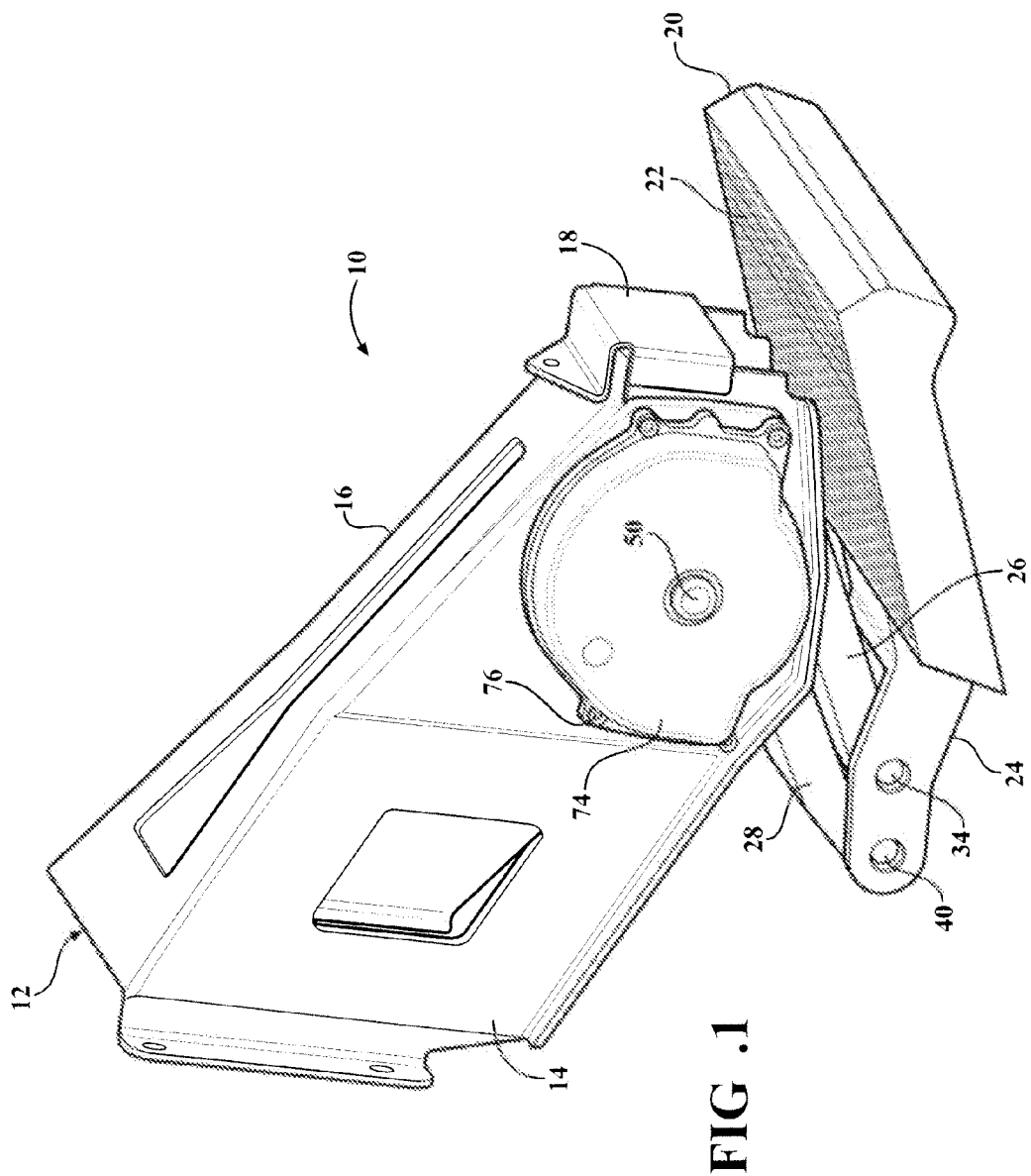
FIG. 1 is a perspective view of a step assembly according to the invention including a step in a retracted position.
Figure 2:
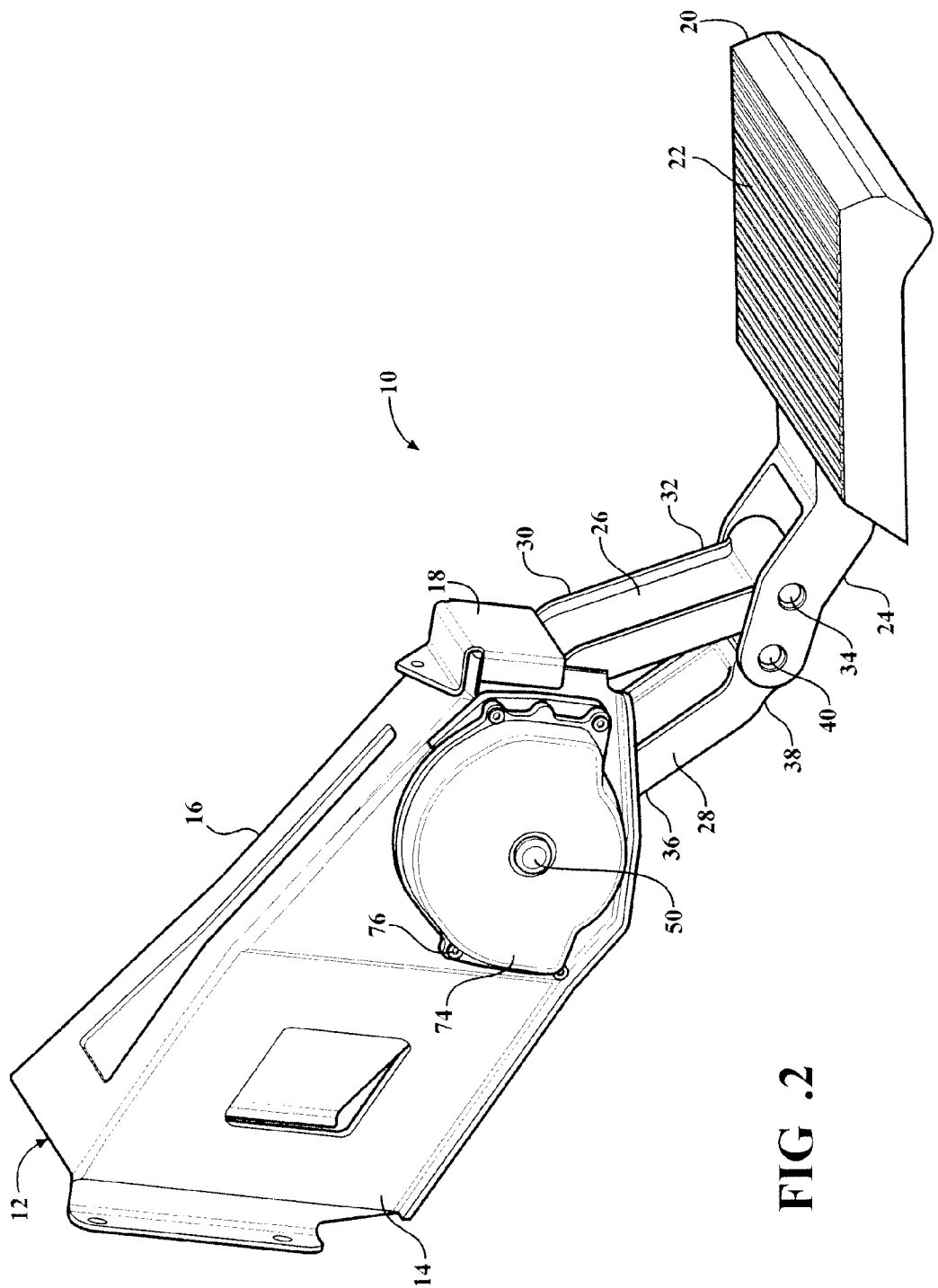
FIG. 2 is a perspective view of the step assembly including the step in an extended position.

Referring to FIGS. 1 and 2, a step assembly, generally shown at 10, includes a mounting bracket 12 adapted to be fixedly secured to an underbody of a motor vehicle. The mounting bracket 12 includes a pair of spaced apart sides 14, 16 and an outboard panel 18 extending between the sides 14, 16. The mounting bracket 12 mounts a step 20 along one side of the motor vehicle. The step 20 includes a stepping surface 22. A link 24 is fixedly secured to the step 20. It is appreciated that the 20 and the link 24 may be formed as a single piece.

The step assembly 10 includes first 26 and second 28 arms each extending between the mounting bracket 12 and the step 20. The first arm 26 includes a first end 30 pivotal with respect to the mounting bracket 12 and an opposing second end 32 pivotally coupled to the step 20 about a pivot pin 34. The second arm 28 includes a first end 36 pivotal with respect to the mounting bracket 12 and an opposing second end 38 pivotally coupled to the step 20 about a pivot pin 40. Pivotal movement of the first 26 and second 28 arms moves the step 20 between a retracted position, shown in FIG. 1, in which the step 20 is at least partially tucked underneath the mounting bracket 20 and an extended position, shown in FIG. 2, in which the step 20 is spaced apart from the mounting bracket 22 in an outboard direction to support individuals entering or exiting the motor vehicle.

Figure 3:
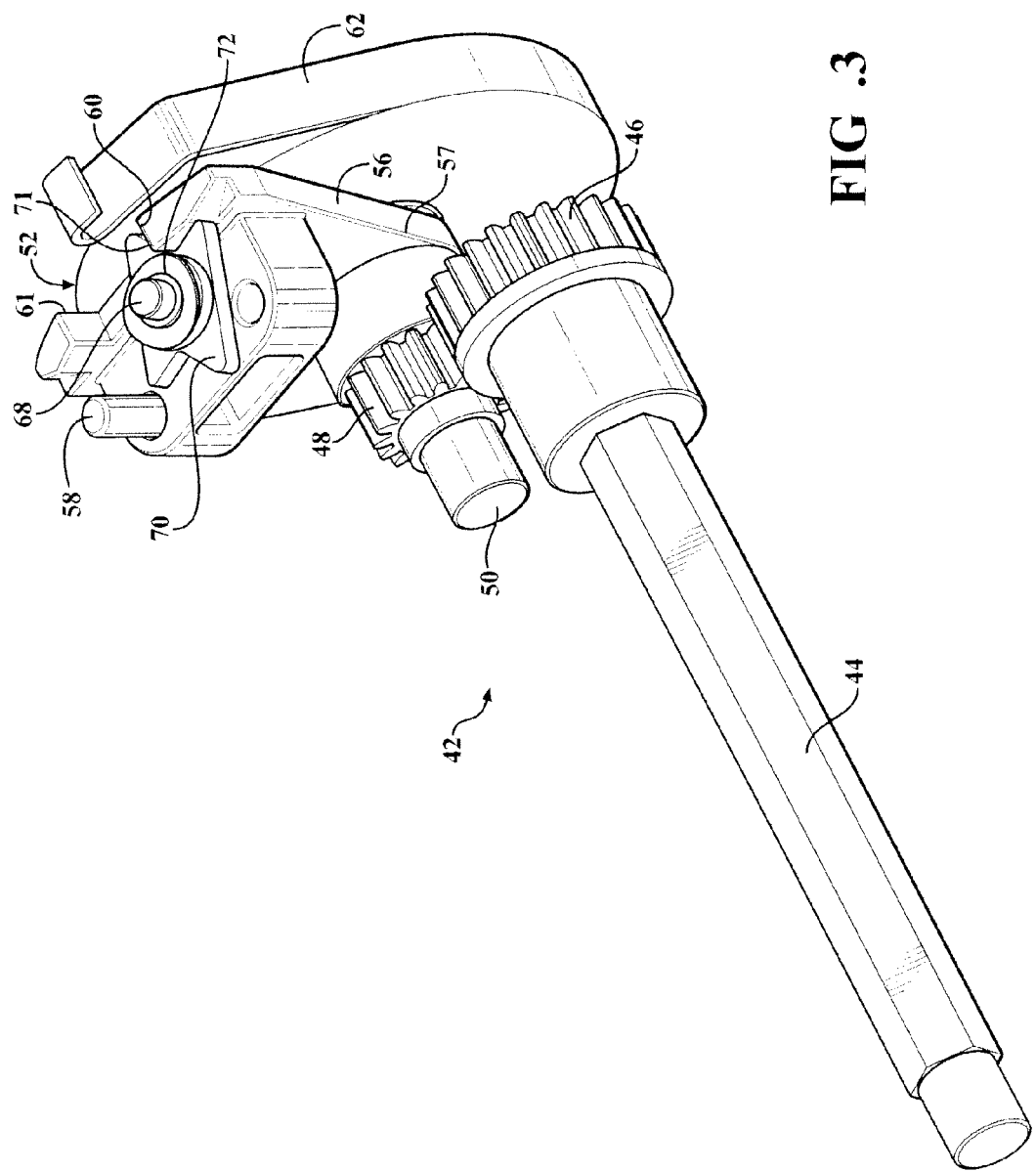
FIG. 3 is a perspective view of a push to release mechanism of the step assembly operably coupled to a latch assembly thereof.
Figure 4:
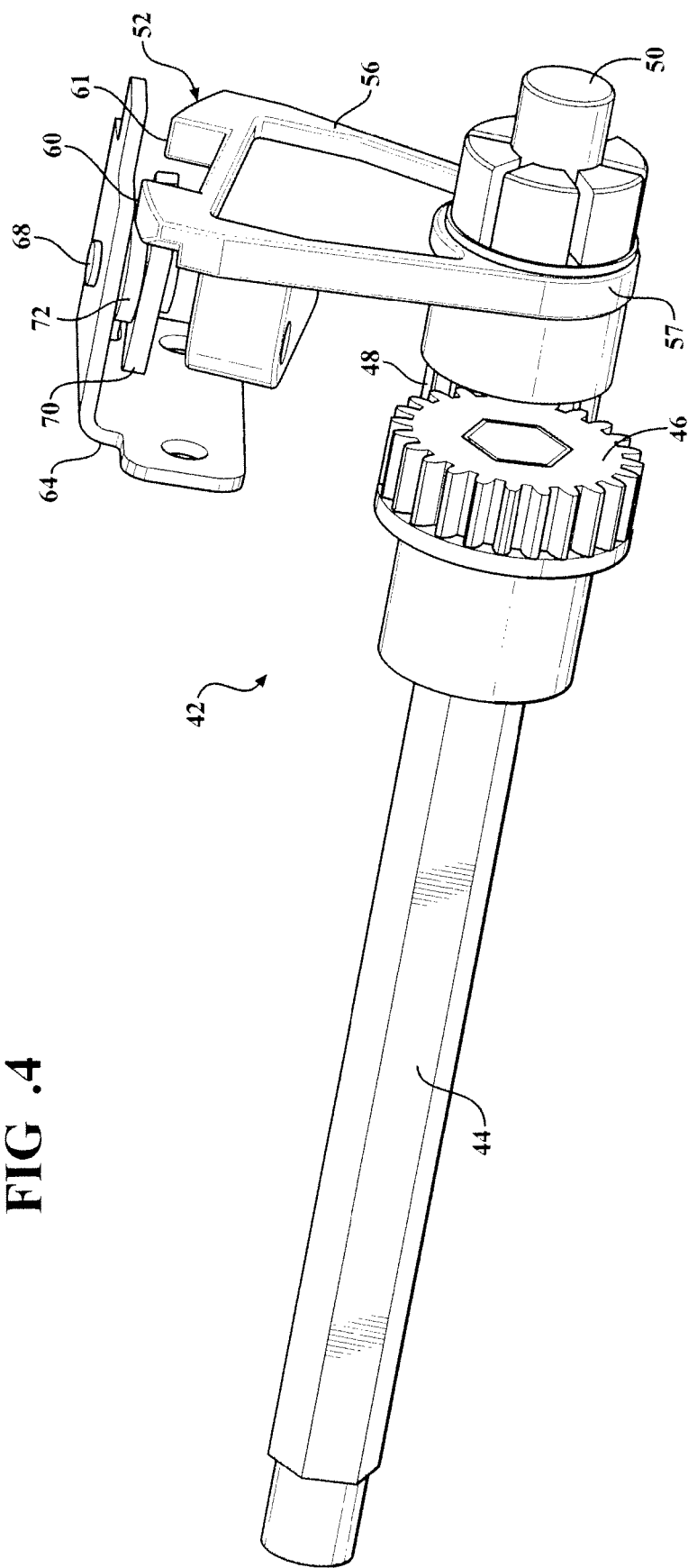
FIG. 4 is a perspective view of the push to release mechanism and the latch assembly operably coupled thereto.
Figure 5:
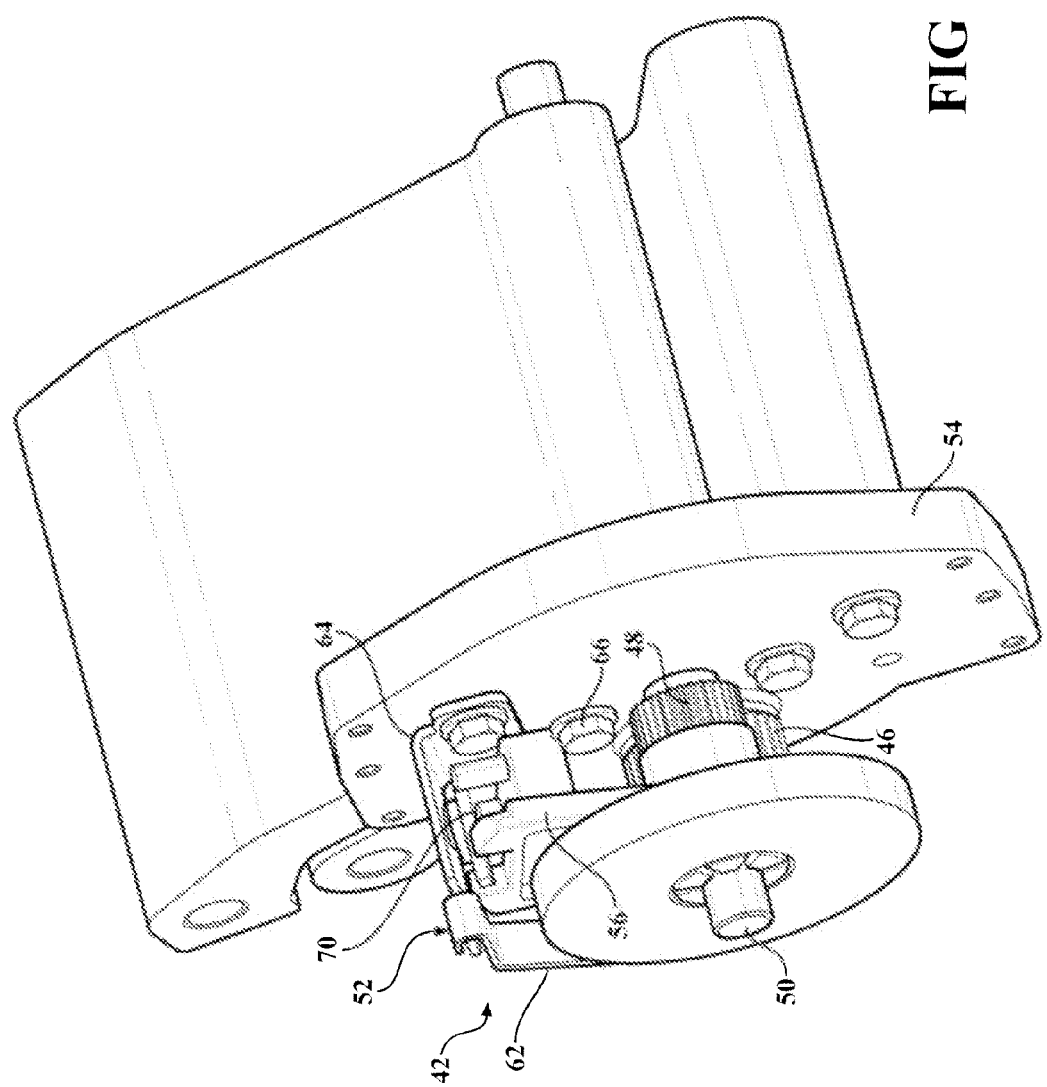
FIG. 5 is a perspective view of the push to release mechanism and the first and second arms positioned relative thereto.

Referring to FIGS. 3 through 5, a push to release mechanism, generally shown at 42, includes a drive shaft 44 that is rotatable about a drive shaft axis. The second arm 28 is fixedly mounted to the drive shaft 44. Therefore, pivotal movement of the second arm 28 will cause rotation of the drive shaft 44. A drive gear 46 is fixedly secured to one end of the drive shaft 44. A pinion gear 48 is in meshing engagement with the drive gear 46. The pinion gear 48 is fixedly secured to an elongated shaft 50 that is rotatable about an elongated shaft axis. Thus, the meshing engagement between the pinion gear 48 and the drive gear 46 causes the elongated shaft 50 to rotate in response to rotation of the drive shaft 44.

The push to release mechanism 42 includes a latch assembly, generally shown at 52, supported by a latch support plate 54. The latch support plate 54 is fixedly secured to the mounting bracket 12. The latch assembly 52 includes a latch hub 56 having a mounting portion 57 fixedly secured to the elongated shaft 50 such that rotation of the elongated shaft 50 causes rotation of the latch hub 56 relative to the latch support plate 54. The latch hub 56 includes a pin 58 extending out therefrom. In addition, the latch hub 56 includes spaced apart fork members 60, 61. One end of a torsion spring 62 is coupled to the latch hub 56.

Referring to FIGS. 4 and 5, the latch assembly 52 includes a pawl bracket 64 fixedly secured to the latch support plate 54 by a plurality of latch plate screws 66. A pawl rivet 68 extends through the pawl bracket 64 and defines a pawl axis. A pawl 70 rotates about the pawl rivet 68 relative to the pawl bracket 64. The pawl 70 is engageable with the latch hub 56. When the pawl 70 is in engagement with the latch hub 56, as shown in FIG. 3, the latch hub 56 is in a locked position and the step 20 is retained in the retracted position. Upon disengagement of the pawl 70 and latch hub 56, the latch hub 56 is in an unlocked position and the step 20 is free to move into the extended position. The torsion spring 62 biases the latch hub 56 towards the unlocked position and, as a result, the step 20 into the extended position. An opposing end of the torsion spring 62 is connected to the pawl bracket 64. Since the torsion spring 62 biases the latch hub 56 in a first direction towards the unlocked position, when the latch hub 56 is in the locked position, as shown in FIG. 3, the fork member 60 is biased against and is in direct engagement with a notch 71 in the pawl 70. The engagement between the fork 60 and the notch 71 prevents the pawl 70 and latch hub 56 from rotating about their respective axes. A wave washer 72 spaces the pawl 70 apart from the pawl bracket 64 to ensure smooth, uninterrupted movement of the pawl 70.

The latch assembly 52 is housed within a latch cover 74, which may be mounted along either side 14, 16 of the mounting bracket 12. The latch assembly 52 is, therefore, in a completely sealed environment, which ensures greater reliability. The latch cover 74 is fixedly secured to the mounting bracket 12 by a plurality of cover screws 76. The elongated shaft 50 extends through the latch cover 74 and rotates relative thereto. In addition, the latch cover 74 provides space for packaging a rotary dampening device to decelerate the motion of the arms 26, 28 and the step 20 as the step 20 reaches the extended position.

The position of the drive gear 46 and the pinion gear 48 allows the axis of rotation for the latch hub 56 to be different from the axis of rotation for the arm 28, thereby facilitating better packaging of the latch assembly 52 for clearance to nearby vehicle components.

In operation, starting with the step 20 in the retracted position, as shown in FIG. 1, an individual provides an initial inward push action to the step 20 to release the step 20 from the retracted position. More specifically, the initial inward push action on the step 20 causes the first 26 and second 28 arms to pivot relative to the mounting bracket 12 and the step 20. Because the second arm 28 is fixedly secured to the drive shaft 44, the drive shaft 44 also rotates at the same time in the first direction. Due to the meshing engagement between the drive gear 46 on the drive shaft 44 and the pinion gear 48, the elongated shaft 50 rotates in a second direction. The latch hub 56, which is fixedly secured to the elongated shaft 50, thus rotates in the second direction against the bias of the torsion spring 62 moving the fork member 60 out of engagement with the pawl 70 and causing the pawl 70 to rotate about the pawl rivet 68 in the second direction. The fork member 60 passes freely by the pawl 70 as the torsion spring 62 biases the latch hub 56 to rotate in the first direction to move the step 20 into the extended position, shown in FIG. 2.

To return the step 20 to the retracted position from the extended position, an upward push action is applied to the step 20 to initiate pivotal movement of the second arm 28. The drive shaft 44 rotates in the first direction and, due to the meshing engagement between the drive gear 46 and the pinion gear 48, the elongated shaft 50 rotates in the second direction. The latch hub 56 thus begins to rotate in the second direction, moving the fork member 60 towards the pawl 70 until the pawl 70 engages the fork member 60 to retain the latch hub 56 in the locked position against the bias of the torsion spring 62. At this time, the latch assembly 52 retains the step 20 in the retracted position.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A step assembly for a motor vehicle, said step assembly comprising:

a mounting bracket adapted to be fixedly secured to the motor vehicle;

a step movable between a retracted position and an extended position;

a drive shaft rotatable relative to said mounting bracket;

a first arm having one end pivotal with respect to said mounting bracket and an opposing end pivotally coupled to said step;

a second aim having one end fixedly secured to said drive shaft and an opposing end pivotally coupled to said step;

a latch hub operably coupled to said drive shaft and pivotally movable between a locked position, to retain said step in said retracted position, and an unlocked position, to allow movement of said step to said extended position, wherein said latch hub is biased in a first direction toward said unlocked position; and a pawl rotatably coupled to said mounting bracket and selectively engageable with said latch hub, wherein said pawl directly engages said latch hub in said locked position, and wherein said pawl is disengaged with said latch hub in said unlocked position;

wherein said step is actuated from said retracted position in response to manually urging said step to rotate said drive shaft in said first direction causing said latch hub to pivot in a second direction disengaging said latch hub from said pawl thereby allowing said latch hub to automatically pivot in said first direction causing said drive shaft to rotate in said second direction and moving said step to said extended position;

and wherein said step is actuated from said extended position in response to manually urging said step to rotate said drive shaft in said first direction causing said latch hub to pivot in said second direction to said locked position to retain said step in said retracted position.

2. A step assembly as set forth in claim 1 including an elongated shaft operably coupled to said drive shaft and rotatable therewith in an opposite direction.

3. A step assembly as set forth in claim 2 wherein said latch hub is fixedly secured to said elongated shaft.

4. A step assembly as set forth in claim 3 including a torsion spring connected to said latch hub for biasing said latch hub into said unlocked position.

5. A step assembly as set forth in claim 4 including a drive gear fixedly secured to said drive shaft.

6. A step assembly as set forth in claim 5 including a pinion gear fixedly secured to said elongated shaft and in meshing engagement with said drive gear for transferring rotational motion between said drive shaft and said elongated shaft.

7. A step assembly for a motor vehicle, said step assembly comprising:
- a mounting bracket adapted to be fixedly secured to the motor vehicle;
- a drive shaft rotatable relative to said mounting bracket;
- an arm having one end fixedly secured to said drive shaft and an opposing end;
- a step pivotally coupled to said opposing end of said arm and movable between a retracted position and an extended position;
- a latch hub operably coupled to said drive shaft and movable about a first axis between a locked position, to maintain said step in said retracted position, and an unlocked position, to allow movement of said step between said retracted and extended positions; and
- a pawl rotatably coupled to said mounting bracket and rotatable about a second axis extending perpendicularly to said first axis, wherein said pawl is engageable with said latch hub to selectively maintain said latch hub in said locked position;
- wherein said step is actuated from said retracted position in response to manually urging said step to rotate said drive shaft in a first direction causing said latch hub to pivot in a second direction disengaging said latch hub from said pawl thereby allowing said latch hub to automatically pivot in said first direction causing said drive shaft to rotate in said second direction and moving said step to said extended position;
- and wherein said step is actuated from said extended position in response to manually urging said step to rotate said drive shaft in said first direction causing said latch hub to pivot in said second direction to said locked position to maintain said step in said retracted position.

8. A step assembly as set forth in claim 7 including an elongated shaft operably coupled to said drive shaft and fixedly supporting said latch hub therealong.

9. A step assembly as set forth in claim 8 including a torsion spring connected to said latch hub for biasing said latch hub in said first direction into said unlocked position.

10. A step assembly as set forth in claim 9 including a drive gear fixedly secured to said drive shaft.

11. A step assembly as set forth in claim 10 including a pinion gear fixedly secured to said elongated shaft and in meshing engagement with said drive gear for transferring rotational motion between said drive shaft and said elongated shaft.

12. A step assembly as set forth in claim 7 wherein said pawl directly engages said latch hub in said locked position.

13. A step assembly for a motor vehicle, said step assembly comprising:
- a mounting bracket adapted to be fixedly secured to the motor vehicle;
- a step movable between a retracted position and an extended position;
- a drive shaft rotatable relative to said mounting bracket about a drive shaft axis;
- a first arm having one end pivotal with respect to said mounting bracket and an opposing end pivotally coupled to said step;
- a second arm having one end fixedly secured to said drive shaft and an opposing end pivotally coupled to said step;
- a latch hub operably coupled to said drive shaft and pivotally movable between a locked position, to retain said step in said retracted position, and an unlocked position, to allow movement of said step to said extended position, wherein said latch hub is biased in a first direction toward said unlocked position; and
- a pawl rotatably coupled to said mounting bracket and rotatable about a pawl axis extending perpendicularly to said drive shaft axis, said pawl selectively engageable with said latch hub, wherein said pawl directly engages said latch hub in said locked position, and wherein said pawl is disengaged with said latch hub in said unlocked position;
- wherein said step is actuated from said retracted position in response to manually urging said step to rotate said drive shaft in said first direction causing said latch hub to pivot in a second direction disengaging said latch hub from said pawl thereby allowing said latch hub to automatically pivot in said first direction causing said drive shaft to rotate in said second direction and moving said step to said extended position;
- and wherein said step is actuated from said extended position in response to manually urging said step to rotate said drive shaft in said first direction causing said latch hub to pivot in said second direction to said locked position to retain said step in said retracted position.

14. A step assembly as set forth in claim 13 including an elongated shaft rotatable relative to said mounting bracket about an elongated shaft axis parallel to said drive shaft axis, wherein said elongated shaft is operably coupled to said drive shaft and rotatable therewith in an opposite direction.

15. A step assembly as set forth in claim 14 wherein said latch hub is fixedly secured to said elongated shaft.

16. A step assembly as set forth in claim 15 including a torsion spring connected to said latch hub for biasing said latch hub into said unlocked position.

17. A step assembly as set forth in claim 16 including a drive gear fixedly secured to said drive shaft.

18. A step assembly as set forth in claim 17 including a pinion gear fixedly secured to said elongated shaft and in meshing engagement with said drive gear for transferring rotational motion between said drive shaft and said elongated shaft.

* * * * *

UNITED STATES PATENT AND TRADEMARK OFFICE
CERTIFICATE OF CORRECTION

| | | |
|---|---|---|
| PATENT NO. | : 8,070,173 B2 | Page 1 of 1 |
| APPLICATION NO. | : 12/438796 | |
| DATED | : December 6, 2011 | |
| INVENTOR(S) | : Watson | |

It is certified that error appears in the above-identified patent and that said Letters Patent is hereby corrected as shown below:

In Claim 1, line 28, should be -- arm having --

Signed and Sealed this
Thirty-first Day of January, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,070,173 B2 | Page 1 of 1 |
| APPLICATION NO. | : 12/438796 | |
| DATED | : December 6, 2011 | |
| INVENTOR(S) | : Watson | |

It is certified that error appears in the above-identified patent and that said Letters Patent is hereby corrected as shown below:

In Claim 1, column 4, line 28, "aim having" should be -- arm having --

This certificate supersedes the Certificate of Correction issued January 31, 2011.

Signed and Sealed this
Twenty-first Day of February, 2012

David J. Kappos
*Director of the United States Patent and Trademark Office*